(12) United States Patent
Yatsu

(10) Patent No.: US 9,999,844 B2
(45) Date of Patent: Jun. 19, 2018

(54) COLD TRAP

(71) Applicant: Sumitomo Heavy Industries, Ltd., Tokyo (JP)

(72) Inventor: Takahiro Yatsu, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 250 days.

(21) Appl. No.: 14/556,664

(22) Filed: Dec. 1, 2014

(65) Prior Publication Data

US 2015/0151215 A1    Jun. 4, 2015

(30) Foreign Application Priority Data

Dec. 2, 2013  (JP) .................................. 2013-249351

(51) Int. Cl.
| | |
|---|---|
| F04B 37/08 | (2006.01) |
| F04D 19/04 | (2006.01) |
| F04B 37/02 | (2006.01) |
| F04B 37/14 | (2006.01) |
| F04B 37/16 | (2006.01) |
| B01D 8/00 | (2006.01) |

(52) U.S. Cl.
CPC ...................................... B01D 8/00 (2013.01)

(58) Field of Classification Search
CPC . B01D 8/00; F04B 37/08; F04B 37/02; F04B 37/14; F04B 37/16; F04D 19/04
See application file for complete search history.

(56) References Cited

U.S. PATENT DOCUMENTS

| | | | | |
|---|---|---|---|---|
| 4,873,913 A | * | 10/1989 | Pruitt ....................... | F04B 37/08 92/158 |
| 5,045,703 A | * | 9/1991 | Wieboldt ................. | G01N 1/40 250/304 |
| 5,259,735 A | | 11/1993 | Takahashi et al. | |
| 5,483,803 A | * | 1/1996 | Matte ....................... | B01D 8/00 415/90 |
| 5,720,174 A | * | 2/1998 | Gorinas ................... | F04B 37/06 417/901 |
| 5,819,545 A | | 10/1998 | Eacobacci, Jr. et al. | |
| 6,092,373 A | * | 7/2000 | Mundinger ............. | F04B 37/08 417/901 |

(Continued)

FOREIGN PATENT DOCUMENTS

| | | | |
|---|---|---|---|
| JP | H0518602 U | * | 3/1993 |
| JP | H06-336676 A | | 12/1994 |

(Continued)

OTHER PUBLICATIONS

"Machine Translation of JP H0518602 U, Mar. 1993".*
"Machine Translation of JPH10-047245, Yamamoto et al, Feb. 1998".*

Primary Examiner — Frantz Jules
Assistant Examiner — Martha Tadesse
(74) Attorney, Agent, or Firm — Michael Best & Friedrich LLP

(57) ABSTRACT

A cold trap is provided between a vacuum chamber and a vacuum pump. The cold trap includes a cold panel and a cold panel chamber that surrounds the cold panel in an exhaust passage. The cold panel includes an expansion panel outside the cold panel chamber. The expansion panel is located in the vacuum chamber.

19 Claims, 4 Drawing Sheets

(56) References Cited

U.S. PATENT DOCUMENTS

| | | | |
|---|---|---|---|
| 6,572,686 B1 * | 6/2003 | Biernat, Jr. | B01D 8/00 |
| | | | 55/DIG. 15 |
| 7,992,394 B2 | 8/2011 | Oikawa | |
| 8,800,303 B2 | 8/2014 | Oikawa | |
| 2010/0107437 A1 * | 5/2010 | Ogata | F26B 5/065 |
| | | | 34/287 |
| 2011/0225989 A1 * | 9/2011 | Tanaka | B01D 8/00 |
| | | | 62/55.5 |

FOREIGN PATENT DOCUMENTS

| | | | |
|---|---|---|---|
| JP | H1047245 | * | 2/1998 |
| JP | 2001-515176 A | | 9/2001 |
| JP | 2005-256771 A | | 9/2005 |
| JP | 2006-063898 A | | 3/2006 |
| JP | 2008-202491 A | | 9/2008 |
| JP | 2009-262083 A | | 11/2009 |
| KR | 960003788 B1 | | 3/1996 |

\* cited by examiner

COLD TRAP

RELATED APPLICATION

Priority is claimed to Japanese Patent Application No. 2013-249351, filed on Dec. 2, 2013, the entire content of which is incorporated herein by reference.

BACKGROUND OF THE INVENTION

1. Field of the Invention

The present invention relates to a cold trap.

2. Description of the Related Art

There is a cold trap provided between a vacuum chamber and a vacuum pump, which is referred to as an in-line type cold trap. A cold panel is placed in an exhaust passage connecting an exhaust port of the vacuum chamber and an intake port of the vacuum pump. The vacuum pump may be a turbo molecular pump. When the in-line type cold trap is used in combination with the turbo molecular pump, the cold trap is primarily used to pump water vapor.

One of the methods to increase the pumping speed of a cold trap is to increase the area of the cold panel. However, such an attempt results in a portion of the exhaust passage being occupied by the cold panel and decrease in the cross-sectional area of the exhaust passage. Consequently, the conductance of the exhaust passage is decreased. This is particularly significant in the case of a thin cold trap having a planar cold panel such as a baffle or a perforated plate. If the conductance of the exhaust passage is decreased, the pumping speed of the downstream vacuum pump (e.g., turbo molecular pump) is decreased. In other words, a typical vacuum pumping system including the in-line type cold trap leads to a trade-off between the pumping speed of the cold trap and the pumping speed of the vacuum pump.

SUMMARY OF THE INVENTION

An embodiment of the present invention addresses a need to increase the pumping speed of a cold trap and, at the same time, mitigating or preventing a decrease of the conductance of an exhaust passage.

According to an embodiment of the present invention, there is provided a cold trap provided between a vacuum chamber and a vacuum pump for the vacuum chamber. The cold trap includes a cold panel and a cold panel chamber that surrounds the cold panel in an exhaust passage from an exhaust port of the vacuum chamber to an intake port of the vacuum pump. The cold panel includes an expansion provided outside the cold panel chamber. The expansion is located in the vacuum chamber.

According to an embodiment of the present invention, there is provided a cold trap provided between a vacuum chamber and a vacuum pump for the vacuum chamber. The cold trap includes a cold panel including a cold panel base located in an exhaust passage from an exhaust port of the vacuum chamber to an intake port of the vacuum pump, and a cold panel chamber including an entrance that connects the exhaust passage to the exhaust port of the vacuum chamber. The cold panel base includes an extension that extends beyond the entrance and into a space outside the cold panel chamber.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

A detailed description of an embodiment to implement the present invention will be given with reference to the drawings. Like numerals are used in the description to denote like elements and the description may be omitted as appropriate. The structure described below is by way of example only and does not limit the scope of the present invention.

Figure 1:
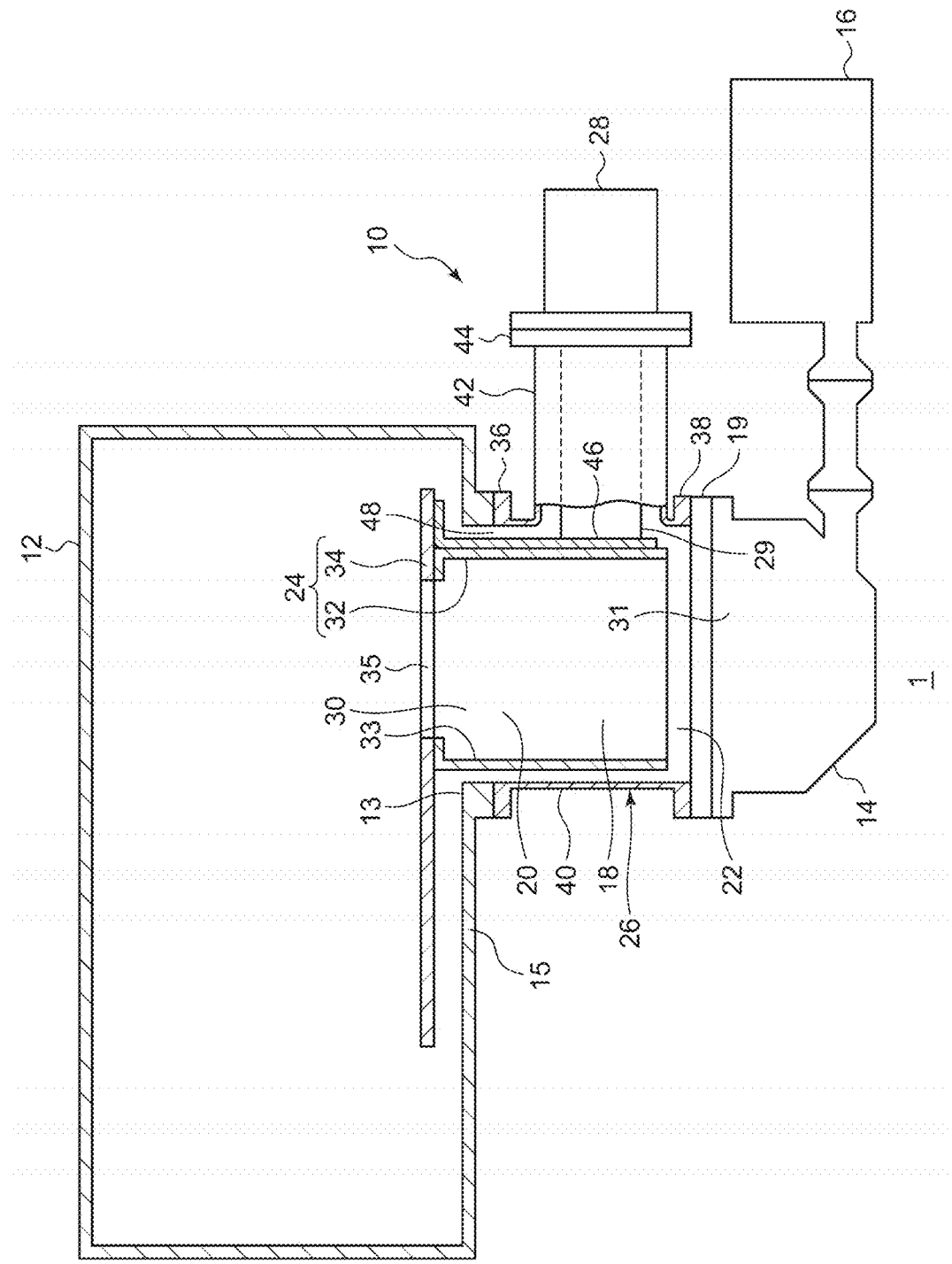
FIG. 1 is a schematic cross sectional view of a vacuum pumping system according to an embodiment of the present invention.
Figure 2:
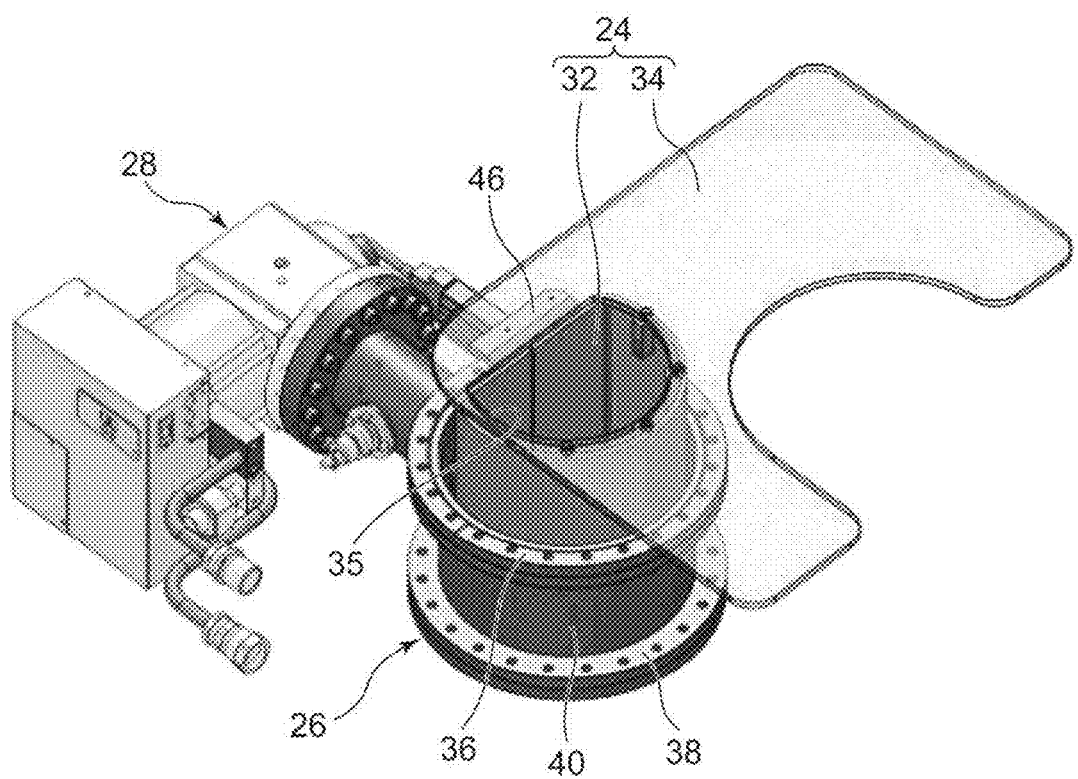
FIG. 2 is a schematic perspective view of a cold trap according to an embodiment of the present invention.
Figure 3:
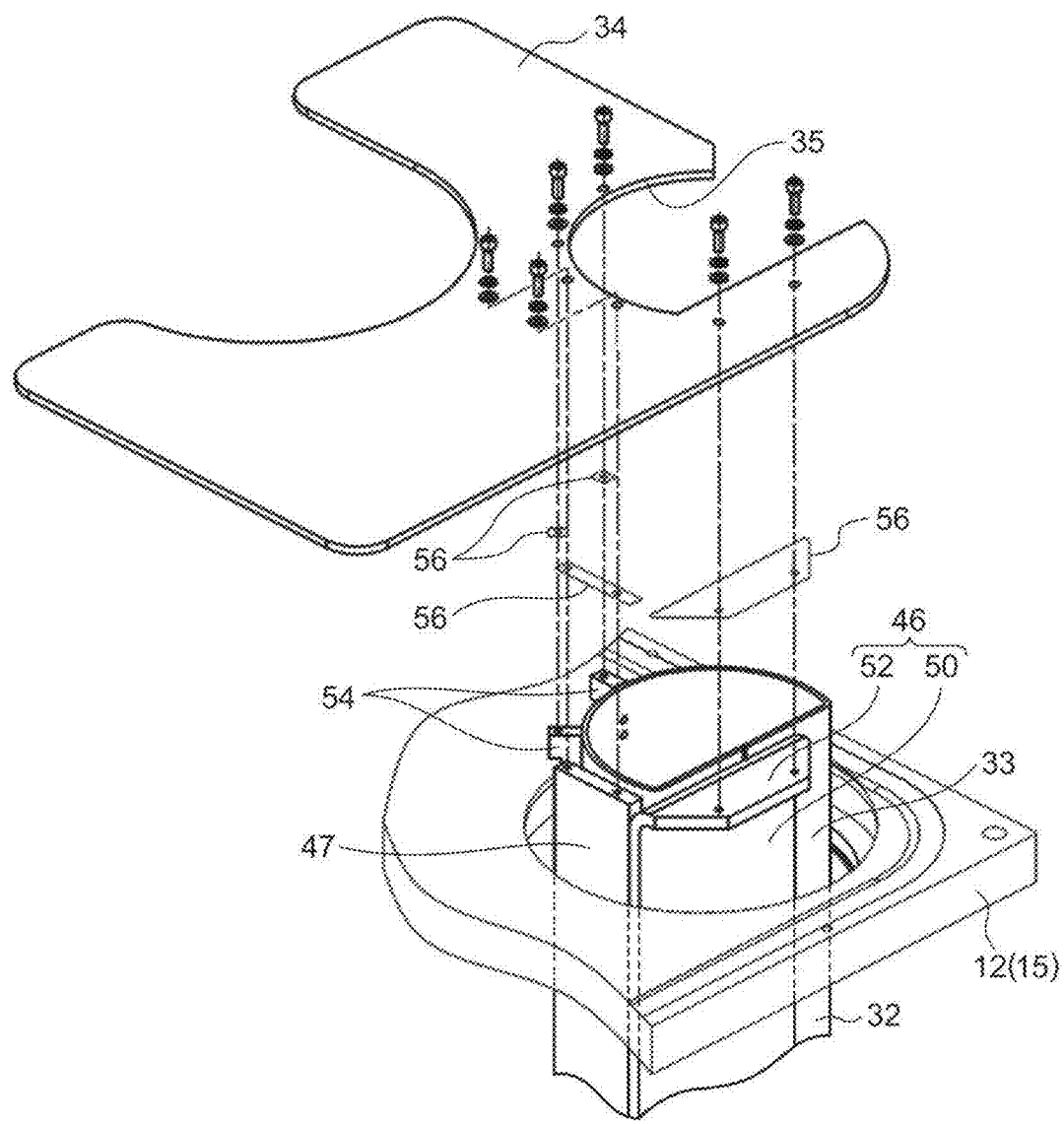
FIG. 3 is a schematic partial view showing how a cold trap according to an embodiment of the present invention is assembled.

FIG. 1 is a schematic cross sectional view of a vacuum pumping system 1 according to an embodiment of the present invention. FIG. 2 is a schematic perspective view of a cold trap 10 according to an embodiment of the present invention. FIG. 3 is a schematic partial view showing how the cold trap 10 is assembled.

As shown in FIG. 1, the vacuum pumping system 1 includes a cold trap 10 and a main vacuum pump (e.g., a turbo molecular pump 14) for evacuating a volume to be evacuated (e.g., a vacuum chamber 12 of a vacuum processing apparatus). The main vacuum pump is a high vacuum pump for evacuating the volume to a high vacuum range. The main vacuum pump is provided in a stage subsequent to the cold trap 10. The main vacuum pump may be a diffusion pump.

In addition to the main vacuum pump, the vacuum pumping system 1 includes an auxiliary pump 16 for rough pumping of the vacuum chamber 12. The auxiliary pump 16 is provided in a stage subsequent to the main vacuum pump. For example, the auxiliary pump 16 is a dry pump.

The turbo molecular pump 14 is connected to the vacuum chamber 12 via an exhaust passage 18. The cold trap 10 is placed between the vacuum chamber 12 and the turbo molecular pump 14. The cold trap 10 is an in-line cold trap. For example, the cold trap 10 is placed above the turbo molecular pump 14 in the vertical direction.

The exhaust passage 18 is a space for guiding a gas from the vacuum chamber 12 to the turbo molecular pump 14. Therefore, the exhaust passage 18 includes an inlet opening 20 toward the vacuum chamber 12 and an outlet opening 22 toward the turbo molecular pump 14. The gas to be pumped enters the exhaust passage 18 from the vacuum chamber 12 via the inlet opening 20 and flows to the turbo molecular pump 14 via the outlet opening 22.

The vacuum pumping system 1 includes a gate valve 19 between the cold trap 10 and an intake port 31 of the turbo molecular pump 14. The gate valve 19 is adjacent to the cold trap 10 below the outlet opening 22. By opening the gate valve 19, the turbo molecular pump 14 is connected to the vacuum chamber 12. By closing the gate valve 19, the turbo molecular pump 14 is disconnected from the vacuum chamber 12. For example, the gate valve 19 is normally closed when the cold trap is regenerated.

The cold trap 10 includes a cold panel 24, a cold panel chamber 26 surrounding a portion of the cold panel 24, and a refrigerator 28 for cooling the cold panel 24. The portion of the cold panel 24 surrounded by the cold panel chamber 26 is located in the exhaust passage 18 from an exhaust port 30 of the vacuum chamber 12 to the intake port 31 of the turbo molecular pump 14. The cold panel chamber 26 is configured to connect the exhaust port 30 of the vacuum chamber 12 to the gate valve 19.

The cold panel 24 is configured to capture the gas on its surface by condensation. The entirety of the cold panel 24 is exposed in the exhaust passage 18 or the vacuum chamber 12. The cold panel 24 is cooled by the refrigerator 28 so as to freeze and capture on its surface a portion of the gas in the exhaust passage 18 or the vacuum chamber 12.

The cold panel 24 includes a cold panel base 32 and an expansion panel 34. The cold panel base 32 has a barrel form and surrounds the central axis of the exhaust passage 18. The expansion panel 34 is an expansion of the cold panel 24 arranged outside the entrance of the cold panel chamber 26. Therefore, the expansion panel 34 is located in the vacuum chamber 12. The expansion panel 34 and the cold panel base 32 may be referred to as an upper panel and a lower panel, respectively.

The cold panel base 32 is a barrel portion of the cold panel 24. For example, the cold panel base 32 has a circular cylindrical form. The cold panel base 32 extends from the inlet opening 20 to the outlet opening 22. Thus, the cold panel 24 has a cold panel surface that extends parallel to the direction of flow (i.e., axial direction) in the exhaust passage 18. The barrel cold panel has an open space in its center part, which does not significantly affect the conductance of the exhaust passage 18. Unlike a planar cold panel that radially extends at a specific position in the axial direction, the barrel cold panel extends axially along the exhaust passage 18 and so has a large surface area. Therefore, the barrel panel form helps increase the pumping speed.

The cold panel base 32 includes an extension 33 that extends beyond the entrance of the cold panel chamber 26 and into a space outside the cold panel chamber 26. The extension 33 extends into the vacuum chamber 12 via the exhaust port 30 of the vacuum chamber 12. The extension 33 is formed to be integrated with the cold panel base 32 and so has the same barrel form (e.g., circular cylindrical form) as the cold panel base 32.

In a state in which the cold trap 10 is mounted to the vacuum chamber 12, the expansion panel 34 extends outward from the exhaust port 30 along a wall 15 of the vacuum chamber 12 surrounding the exhaust port 30 of the vacuum chamber 12. The expansion panel 34 is provided outward from the cold panel base 32. In a space outside the cold panel chamber 26, the expansion panel 34 extends perpendicularly from the extension 33 of the cold panel base 32. Since the expansion panel 34 is provided near the wall 15 of the vacuum chamber 12, interference with the existing structure or components of the vacuum chamber 12 can be easily avoided.

The expansion panel 34 is formed with an opening 35 aligned with the exhaust passage 18. The expansion panel 34 is mounted to the extension 33 of the cold panel base 32 such that the upper end of the extension 33 conforms with the outer circumference of the opening 35. As shown in FIG. 2, the opening 35 may be a through hole formed in the expansion panel 34. Alternatively, as shown in FIG. 3, a portion of the outer circumference of the expansion panel 34 forming the opening 35 may be cut out.

As illustrated, the expansion panel 34 having a large area is deployed in the vacuum chamber 12. The surface area of the expansion panel 34 toward the vacuum chamber 12 (i.e., opposite to the wall 15) may be larger than the interior surface area of the cold panel base 32. This arrangement produces a cold panel area twice as large or greater as compared to a case where the cold panel 24 only includes the cold panel base 32.

The dimensions of the planar expansion panel 34 may be defined such that the design cooling temperature at the outer edge of the expansion panel 34 is equal to or lower than a predetermined upper limit temperature (e.g., 130 K) and/or such that the outer edge of the expansion panel 34 does not come into contact with the wall 15 of the vacuum chamber 12 due to warp of the expansion panel 34.

FIG. 2 shows the expansion panel 34 semi-transparently to promote the understanding of the structure of the cold trap 10 according to the embodiment. In reality, the expansion panel 34 is, for example, a metal plate and is non-transparent.

The cold panel chamber 26 includes an entrance that connects the exhaust passage 18 to the exhaust port 30 of the vacuum chamber 12 and an exit that connects the exhaust passage 18 to the intake port 31 of the turbo molecular pump 14. The exit connects the exhaust passage 18 to the gate valve 19. Thus, by placing the gate valve 19 between the turbo molecular pump 14 and the cold trap 10, the liquefied material (e.g., water) produced during regeneration of the cold trap 10 is blocked by the gate valve 19 from entering the turbo molecular pump 14.

The entrance of the cold panel chamber 26 includes an inlet flange 36 for mounting the cold panel chamber 26 to the vacuum chamber 12 (or to the first element adjacent to the entrance of the cold trap 10). The exit of the cold panel chamber 26 includes an outlet flange 38 for mounting the cold panel chamber 26 to the second element (i.e., the gate valve 19) adjacent to the exit of the cold trap 10. The inlet flange 36 and the outlet flange 38 are vacuum flanges. The inlet flange 36 and the outlet flange 38 have the same diameter. The inlet flange 36 and the outlet flange 38 are coaxially arranged with the central axis of the exhaust passage 18.

The cold panel chamber 26 further includes a body part 40. The body part 40 is a conduit that surrounds the exhaust passage 18. The body part 40 has a diameter which is constant in the direction of its extension. The cold panel base 32 is placed so as to create a radial gap from the interior surface of the body part 40. The cold panel base 32 extends to the neighborhood of the outlet flange 38 along the body part 40. The extension 33 of the cold panel base 32 is placed so as to create a radial gap from the inner circumferential surface of the inlet flange 36. This produces a double tubular structure in which the cold panel 24 is an inner tube and the cold panel chamber 26 is an outer tube.

The outlet flange 38 is provided at a distance from the inlet flange 36 in the direction of extension of the body part 40 (in the vertical direction in FIG. 1). In other words, the inlet flange 36 and the outlet flange 38 are spaced away from each other in the axial direction, the body part 40 connecting the two flanges. The inlet opening 20 is formed in the inlet flange 36 and the outlet opening 22 is formed in the outlet flange 38. The inlet flange 36 is mounted to an exhaust port flange 13 of the vacuum chamber 12, and the outlet flange 38 is mounted to a flange (not shown) of the gate valve 19.

Instead of directly mounting the vacuum chamber 12 to the cold trap 10, another element (e.g., the gate valve 19) may be provided between the cold trap 10 and the vacuum chamber 12. In this case, the inlet flange 36 is mounted to that element adjacent to the cold trap. Instead of mounting the turbo molecular pump 14 to the cold trap 10 via a separate element like the gate valve 19, the cold trap 10 may be directly mounted to the turbo molecular pump 14. In this case, the outlet flange 38 is mounted to the intake port flange of the turbo molecular pump 14.

The body part 40 includes a refrigerator housing 42 for accommodating the refrigerator 28 between the inlet flange 36 and the outlet flange 38. The refrigerator housing 42 forms a part of the cold panel chamber 26. A lateral opening for connecting the cold panel 24 to the refrigerator 28 is formed on the lateral side of the body part 40. The refrigerator housing 42, which surrounds at least a portion of the refrigerator 28, extends radially outward from the circumference of the lateral opening. A refrigerator mount flange 44 is formed at the end of the refrigerator housing 42, and the refrigerator 28 is mounted to the refrigerator mount flange 44.

The cold panel 24 is mounted to a cooling stage 29 of the refrigerator 28 via a support member 46 having an L-shaped cross section. The cold panel base 32 and the expansion panel 34 are mounted on one surface of the support member 46. The cooling stage 29 is mounted to the other surface of the support member 46. The support member 46 structurally supports the expansion panel 34 on the cold panel base 32 and thermally couples the cooling stage 29 of the refrigerator 28 to the cold panel 24. Thus, the support member 46 forms a part of the cold panel 24. The cold panel 24 may be directly mounted to the cooling stage 29. For example, the refrigerator 28 may be a Gifford-McMahon type refrigerator (so-called GM refrigerator). The refrigerator 28 is a single stage refrigerator.

A radial gap 48 is formed between the cold panel 24 and the cold panel chamber 26. The support member 46 is provided in the gap 48. As shown in FIG. 3, the support member 46 includes a flat part 50 that axially extends along the body part 40 between the cold panel base 32 and the portion of the body part 40 toward the refrigerator 28, and a bent part 52 formed at the upper end of the flat part and bent radially outward. The flat part 50 extends into the vacuum chamber 12 via the exhaust port 30 of the vacuum chamber 12 so that the bent part 52 is inside the vacuum chamber 12. The support member 46 is not in contact with the body part 40. As shown in FIGS. 2 and 3, the surface on which the cold panel base 32 is mounted to the support member 46 may be formed to be flat.

The expansion panel 34 may be supported by a plurality of members. For example, as shown in FIG. 3, a second support member 47 may be provided in addition to the support member 46 described above. The second support member 47 is arranged perpendicularly from one of the edges of the flat part 50 of the support member 46 toward the cold panel base 32. The cold panel base 32 may be provided with an expansion panel mount 54 on the upper end of the cold panel base 32. The expansion panel mount 54 is a projection formed to extend radially outward from the upper end of the cold panel base 32.

As shown in FIG. 3, the expansion panel 34 and the support members 46 and 47 are secured to each other using an appropriate fastening member. Similarly, the expansion panel 34 and the expansion panel mount 54 are secured to each other using an appropriate fastening member.

The support members 46 and 47 and the expansion panel mount 54 are provided outward from the cold panel base 32. Therefore, the support members 46 and 47 and the expansion panel mount 54 are not provided in the exhaust passage 18. The structure like this is advantageous in that the support members 46 and 47 and the expansion panel mount 54 do not decrease the conductance of the exhaust passage 18.

The cold panel 24 includes a heat transfer layer 56 between the support member 46, 47 and the expansion panel 34. The heat transfer layer 56 is similarly provided between the expansion panel mount 54 and the expansion panel 34. The heat transfer layer 56 is formed of a material softer than that of the support members 46 and 47 and the expansion panel 34. For example, the heat transfer layer 56 may be a sheet member made of indium. The heat transfer layer 56 may be formed of a material softer than that of the support members 46 and 47 or the expansion panel 34. The heat transfer layer 56 may be provided between other members. For example, the heat transfer layer 56 may be provided between the support member 46, 47 and the cold panel base 32. By interposing the heat transfer layer 56, thermal contact between members is improved.

In the pumping process performed by the vacuum pumping system 1 shown in FIG. 1, the vacuum chamber 12 is evacuated and the degree of vacuum is increased to a desired level by opening the gate valve 19 and operating the turbo molecular pump 14. The vacuum chamber 12 may be evacuated by the auxiliary pump 16 for rough pumping before operating the turbo molecular pump 14. The cold trap 10 is cooled to a temperature (e.g., 100 K) at which water vapor flowing through the exhaust passage 18 can be captured. Generally, the turbo molecular pump 14 can discharge water vapor at a relatively low pumping speed. By using the cold trap 10 in combination with the turbo molecular pump 14, a high pumping speed is achieved.

According to the embodiment, the cold trap 10 includes the expansion panel 34 having a large area within the vacuum chamber 12. Accordingly, the area of the opening of the exhaust port 30 of the vacuum chamber 12 does not constitute a constraint on the pumping speed. Thus, the cold trap 10 having an improved pumping speed is achieved. The expansion panel 34 includes the opening 35 aligned with the exhaust port 30 of the vacuum chamber 12 so that the exhaust port 30 is open. More specifically, the expansion panel 34 is only provided outward from the cold panel base 32 and is not provided inward from the cold panel base 32. Accordingly, provision of the expansion panel 34 does not decrease the area of the opening of the exhaust passage 18, i.e., does not decrease the conductance of the exhaust passage 18 substantively.

The upper end of the extension 33 of the cold panel base 32 is located near the exhaust port 30 of the vacuum chamber 12. The expansion panel 34 extends radially outward from the upper end along the wall 15 of the vacuum chamber 12. The structure also helps prevent decrease of the conductance of the exhaust passage 18. For example, if the extension 33 of the cold panel base 32 axially extends in an elongated manner toward the center of the vacuum chamber 12, the conductance of the exhaust passage 18 will be lower than that of the embodiment.

Therefore, according to the embodiment, the pumping speed of the cold trap 10 is improved without affecting the pumping speed of the turbo molecular pump 14. Thus, the cold trap 10 achieves a high speed pumping of water so that the turbo molecular pump 14 achieves a high speed pumping of other gases (e.g., argon and nitrogen). In this way, the vacuum pumping system 1 having a high pumping performance is provided.

In this specification, terms like "axial direction" (or "axially") and "radial direction" (or "radially") are used to facilitate the understanding of the relative positions of constituting elements. The axial direction represents a direction that extends along the exhaust passage 18 (or the direction of extension of the body part 40), and the radial direction represents a direction perpendicular to the axial direction. For ease of understanding, relative closeness to the vacuum chamber 12 in the axial direction may be referred to as "above" and relative remoteness may be referred to as "below". In other words, relative remoteness from the turbo molecular pump 14 may be referred to as "above" and relative closeness may be referred to as "below". Closeness to the center of the exhaust passage 18 in the radial direction may be referred to as "inward" and remoteness from the center of the exhaust passage 18 may be referred to as "outward". These expressions are irrelevant to the actual layout occurring when the cold trap 10 is mounted to the vacuum chamber 12 and the turbo molecular pump 14. For example, the cold trap 10 may be mounted to the vacuum chamber 12 such that the outlet opening 22 faces up in the vertical direction and the inlet opening 20 faces down in the vertical direction.

Described above is an explanation based on an exemplary embodiment. The invention is not limited to the embodiment described above and it will be obvious to those skilled in the art that various design changes and variations are possible and that such modifications are also within the scope of the present invention.

Figure 4:
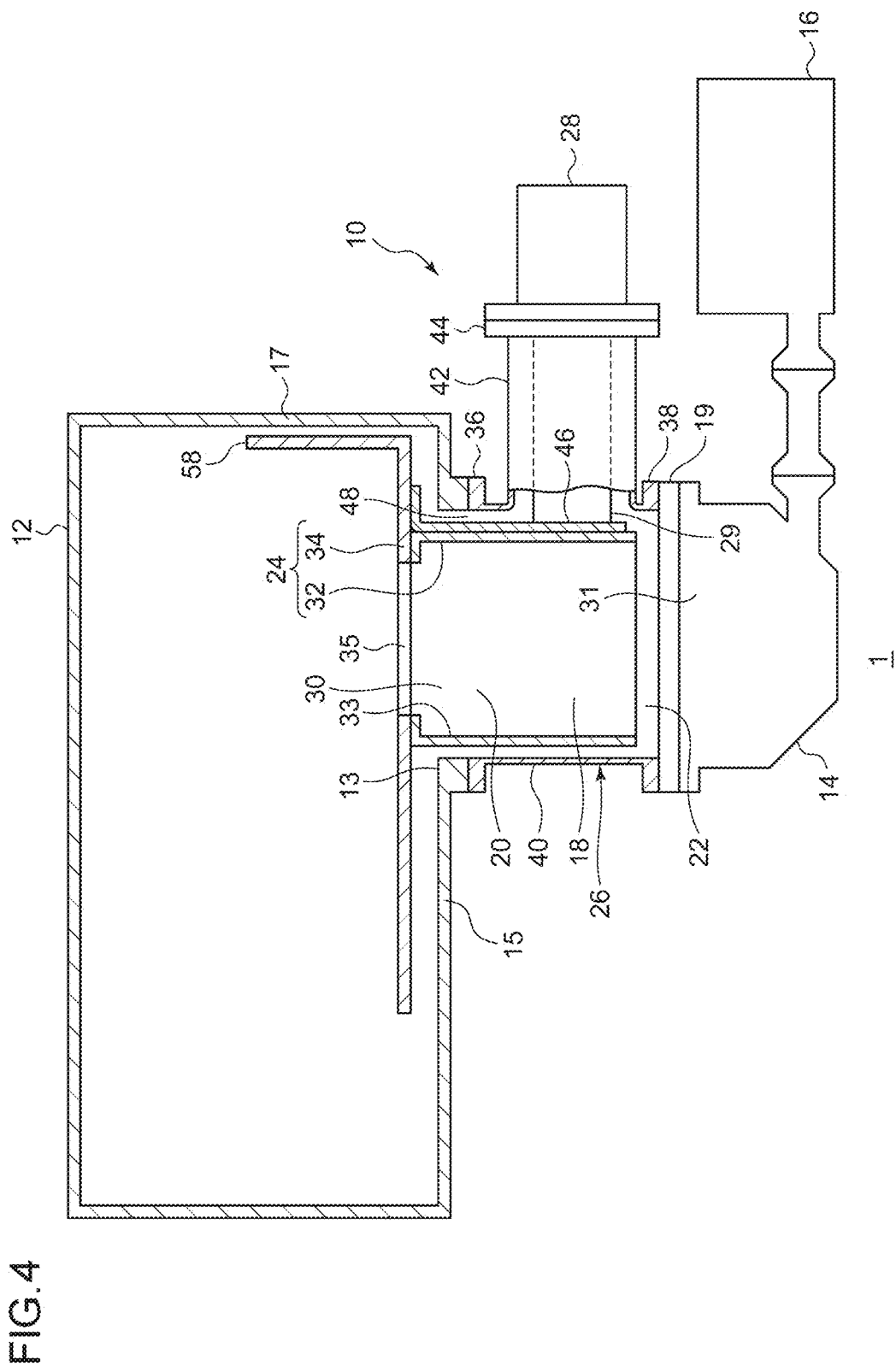
FIG. 4 is a schematic cross sectional view of a vacuum pumping system according to another embodiment of the present invention.

FIG. 4 is a schematic cross sectional view of a vacuum pumping system 1 according to another embodiment of the present invention. In this variation, the expansion panel 34 not only extends along the wall 15 of the vacuum chamber 12 as described above but the expansion panel 34 includes a panel part 58 that extends along another wall 17 of the vacuum chamber 12. These two walls 15 and 17 are adjacent to each other and intersect each other substantially at right angles. Therefore, the panel part 58 bends substantially perpendicularly from the expansion panel 34 along the wall 17 and extends upward. In this way, the cold panel 24 having a larger surface area is provided. That the panel part 58 of the expansion panel 34 is relatively closer to the refrigerator 28 is advantageous for the purpose of cooling.

In the embodiment described above, the expansion panel 34 extends radially outward from the cold panel base 32. In an embodiment, however, the expansion panel 34 may include an extension that extends radially inward in order to increase the pumping speed of the cold trap 10. The inward extension of the expansion panel 34 may extend from the peripheral region of the exhaust passage 18 toward the center region of the exhaust passage 18 so as to maintain the center region of the exhaust passage 18 open. The extension may be formed to be integrated with the expansion panel 34 or formed as a separate member. The extension may be a circular plate having an opening at the center. The extension may be mounted to the upper end of the cold panel base 32 so as to be coaxial with the cold panel base 32.

The cold panel 24 according to the embodiment includes the cold panel base 32 of a barrel form and the planar expansion panel 34. Alternatively, various forms of the cold panel 24 are possible. For example, an additional cold panel (e.g., at least one flat panel extending along the direction of flow) may be provided inside the cold panel base 32. Alternatively, the cold panel base 32 may be a planar cold panel such as a baffle or a perforated plate. Still alternatively, such a planar cold panel may be additionally provided with the cold panel base 32. The expansion panel 34 may include a 3-D structure such as a rib.

It should be understood that the invention is not limited to the above-described embodiment, but may be modified into various forms on the basis of the spirit of the invention. Additionally, the modifications are included in the scope of the invention.

What is claimed is:

1. A cold trap provided between a vacuum chamber and a vacuum pump for the vacuum chamber, the vacuum chamber connected to the vacuum pump via an axially extending exhaust passage from an exhaust port of the vacuum chamber to an intake port of the vacuum pump, the cold trap comprising:
a single stage refrigerator;
a cold panel comprising a cylindrical cold panel base axially extending along the axially extending exhaust passage and thermally coupled to the single stage refrigerator such that the cylindrical cold panel base is cryogenically cooled, the cylindrical cold panel base surrounding a center open cylindrical space forming part of the axially extending exhaust passage and allowing a gas evacuation flow from the exhaust port of the vacuum chamber to the intake port of the vacuum pump through the center open cylindrical space; and
a cold panel chamber comprising a cylindrical body part surrounding the cold panel and extending along the cylindrical cold panel base without physical contact with the cold panel and an outlet flange protruding radially outward from an axial end of the cylindrical body part which is closer to the vacuum pump,
wherein the cold panel comprises an expansion provided outside the cold panel chamber and the expansion is located in the vacuum chamber,
wherein, as axially viewed, an outer perimeter of the expansion comprises a concave.

2. The cold trap according to claim 1, wherein, in a state in which the cold trap is mounted to the vacuum chamber, the expansion extends outward along a wall of the vacuum chamber from the exhaust port of the vacuum chamber, the wall surrounding the exhaust port.

3. The cold trap according to claim 1, wherein the cylindrical cold panel base comprises a cylindrical extension that axially extends into the vacuum chamber, and the expansion is provided radially outward from the cylindrical extension.

4. The cold trap according to claim 3, wherein the expansion is mounted to the cylindrical cold panel base via a support member.

5. The cold trap according to claim 4, wherein the cold panel comprises a heat transfer layer between the support member and the expansion, and the heat transfer layer is formed of a material softer than that of the support member and/or the expansion.

6. The cold trap according to claim 4, wherein the support member is provided in a gap between the cylindrical cold panel base and the cylindrical body part of the cold panel chamber.

7. The cold trap according to claim 1, wherein a gate valve is provided between the cold trap and the intake port of the vacuum pump.

8. The cold trap according to claim 1, wherein the vacuum pump is a turbo molecular pump.

9. A cold trap provided between a vacuum chamber and a vacuum pump for the vacuum chamber, the vacuum chamber connected to the vacuum pump via an axially extending exhaust passage from an exhaust port of the vacuum chamber to an intake port of the vacuum pump, the cold trap comprising:
- a single stage refrigerator;
- a cold panel comprising a cylindrical cold panel base axially extending along the axially extending exhaust passage and thermally coupled to the single stage refrigerator such that the cylindrical cold panel base is cryogenically cooled, the cylindrical cold panel base surrounding a center open cylindrical space forming part of the axially extending exhaust passage and allowing a gas evacuation flow from the exhaust port of the vacuum chamber to the intake port of the vacuum pump through the center open cylindrical space; and
- a cold panel chamber comprising an entrance that connects the axially extending exhaust passage to the exhaust port of the vacuum chamber, a cylindrical body part surrounding the cold panel and extending along the cylindrical cold panel base without physical contact with the cold panel and an outlet flange protruding radially outward from an axial end of the cylindrical body part which is closer to the vacuum pump,
- wherein the cylindrical cold panel base comprises an extension that extends beyond the entrance and into a space outside the cold panel chamber and an expansion that extends perpendicularly from the extension in the space outside the cold panel chamber,
- wherein, as axially viewed, an outer perimeter of the expansion comprises a concave.

10. The cold trap according to claim 5, wherein the heat transfer layer is a sheet member made of indium.

11. The cold trap according to claim 2, wherein the expansion comprising a panel part extending along another wall of the vacuum chamber.

12. The cold trap according to claim 1, wherein the expansion comprises an opening into the center open cylindrical space.

13. The cold trap according to claim 12, wherein the concave is located outside of the opening.

14. A cold trap provided between a vacuum chamber and a vacuum pump for the vacuum chamber, the vacuum chamber connected to the vacuum pump via an axially extending exhaust passage from an exhaust port of the vacuum chamber to an intake port of the vacuum pump, the cold trap comprising:
- a single stage refrigerator;
- a cold panel comprising a cylindrical cold panel base axially extending along the axially extending exhaust passage and thermally coupled to the single stage refrigerator such that the cylindrical cold panel base is cryogenically cooled, the cylindrical cold panel base surrounding a center open cylindrical space forming part of the axially extending exhaust passage and allowing a gas evacuation flow from the exhaust port of the vacuum chamber to the intake port of the vacuum pump through the center open cylindrical space; and
- a cold panel chamber comprising a cylindrical body part surrounding the cold panel and extending along the cylindrical cold panel base without physical contact with the cold panel and an outlet flange protruding radially outward from an axial end of the cylindrical body part which is closer to the vacuum pump,
- wherein the cold panel comprises an expansion provided outside the cold panel chamber and the expansion is located in the vacuum chamber,
- wherein the cylindrical cold panel base comprises a cylindrical extension that axially extends into the vacuum chamber, and the expansion is provided radially outward from the cylindrical extension,
- wherein the expansion is mounted to the cylindrical cold panel base via an L-shaped support member having an L-shaped cross section,
- wherein the cylindrical cold panel base and the expansion are mounted on a first surface of the L-shaped support member and a cooling stage of the single stage refrigerator is mounted to a second surface of the L-shaped support member, the second surface being opposite to the first surface.

15. The cold trap according to claim 14, wherein the first surface of the L-shaped support member comprises a flat part and a radially outward bent part formed at an upper end of the flat part.

16. The cold trap according to claim 15, wherein the cylindrical cold panel base comprises a flat surface mounted to the flat part of the first surface of the L-shaped support member.

17. The cold trap according to claim 16, wherein the expansion is mounted on the radially outward bent part of the first surface of the L-shaped support member.

18. The cold trap according to claim 14, wherein the expansion is mounted to the cylindrical cold panel base via a plurality of support members including the L-shaped support member.

19. The cold trap according to claim 14, wherein the cold panel comprises a heat transfer layer sandwiched between the L-shaped support member and the expansion, and the heat transfer layer is formed of a material softer than that of the L-shaped support member and/or the expansion.

* * * * *